P. C. HEWITT.
METHOD OF AND APPARATUS FOR CONTROLLING ELECTRIC CURRENT.
APPLICATION FILED JULY 6, 1916.
1,402,933.
Patented Jan. 10, 1922.
3 SHEETS—SHEET 1.
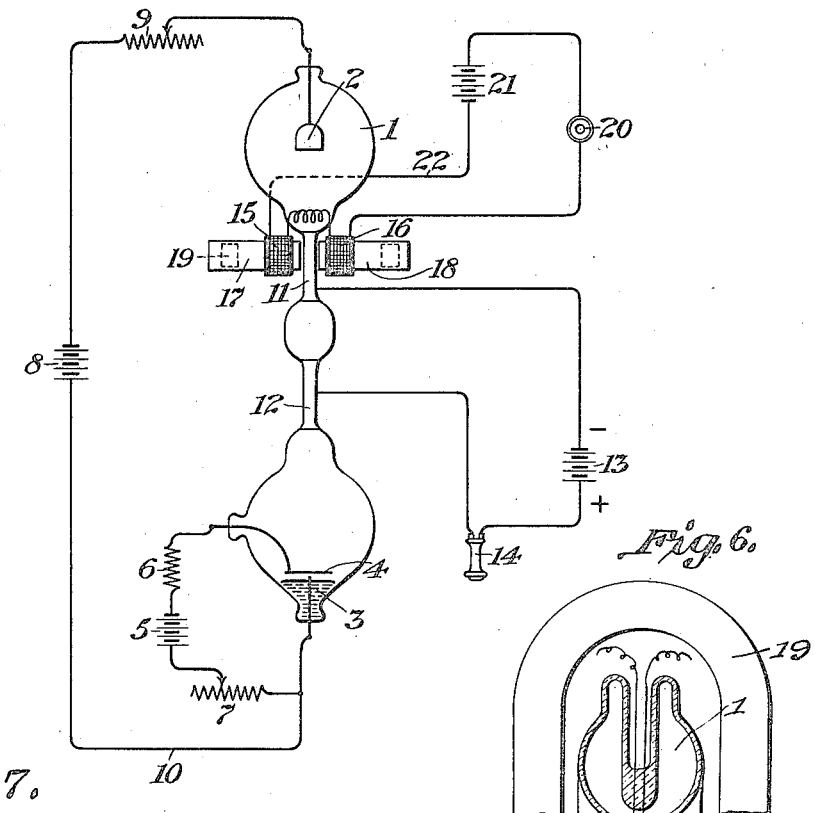
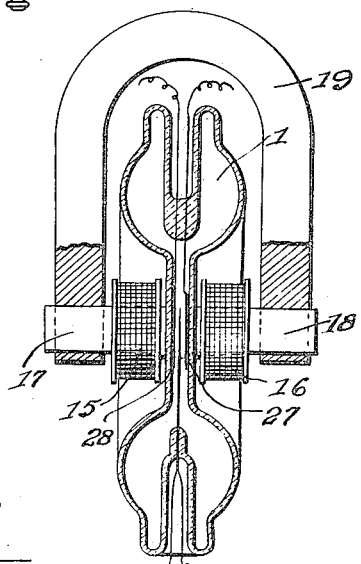
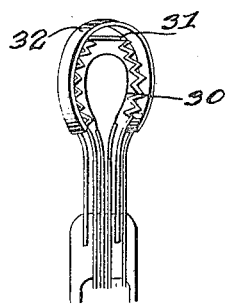
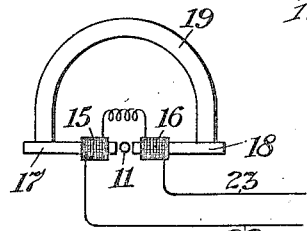
WITNESS
Chas. F. Clagett
Thos. H. Brown
INVENTOR
Peter Cooper Hewitt
BY
Charles A. Terry
ATTORNEY P. C. HEWITT.
METHOD OF AND APPARATUS FOR CONTROLLING ELECTRIC CURRENT.
APPLICATION FILED JULY 6, 1916.
1,402,933.
Patented Jan. 10, 1922.
3 SHEETS—SHEET 2.
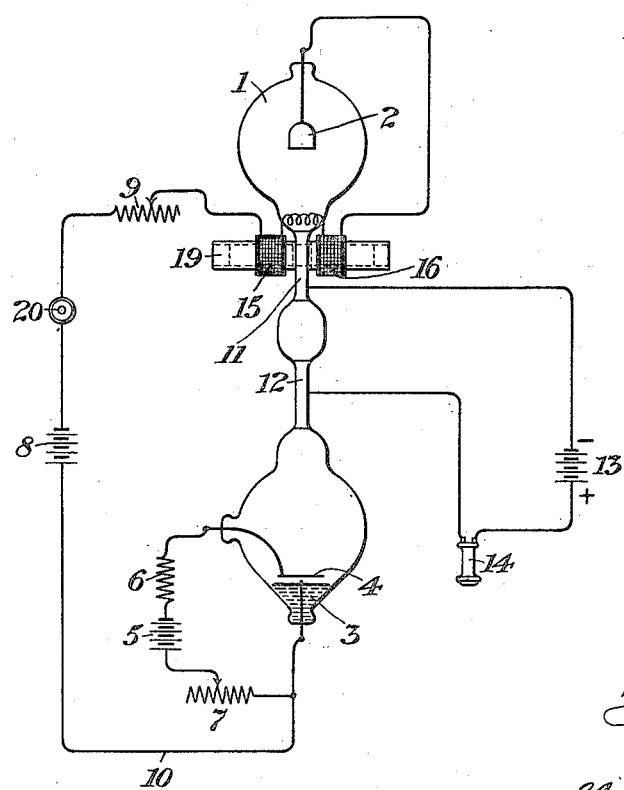
Fig. 3
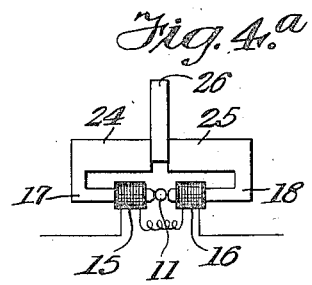
Fig. 4.a
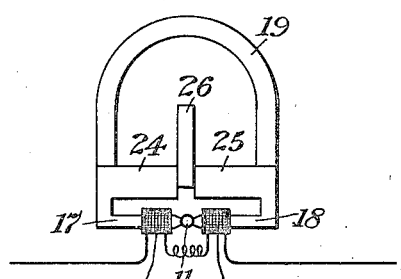
Fig. 4
WITNESS
Chas. F. Clagett
Tho. H. Brown
INVENTOR
Peter Cooper Hewitt
BY
Charles A. Terry
ATTORNEY

UNITED STATES PATENT OFFICE.

PETER COOPER HEWITT, OF RINGWOOD MANOR, NEW JERSEY.

METHOD OF AND APPARATUS FOR CONTROLLING ELECTRIC CURRENT.

1,402,933.    Specification of Letters Patent.    Patented Jan. 10, 1922.

Application filed July 6, 1916. Serial No. 107,850.

*To all whom it may concern:*

Be it known that I, PETER COOPER HEWITT, a citizen of the United States, and resident of Ringwood Manor, county of Passaic, State of New Jersey, have invented certain new and useful Improvements in Methods of and Apparatus for Controlling Electric Current, of which the following is a specification.

My invention relates to a method of and apparatus for controlling current in an electric circuit by the action of a magnetic field on an electrode in a vacuum, gas, or vapor device, said electrode acting as a negative electrode included in said circuit, and for causing variations in the magnetic field to produce variations of electric energy in the circuit in which the electrode acting as a negative is included. Any suitable means for varying the action of a magnetic field of force on the electrode may be used.

One of the objects of my invention is to reproduce in one electric circuit variations corresponding in some degree to variations in another circuit. The variations reproduced in one circuit may be of greater, the same, or of less energy value than the variations in the other circuit.

I have discovered that when an electrode is placed in a vacuum, gas, or vapor device in which there is current flow from a separate source, it will serve as a cathode to permit an amount of current to pass, determined by the current density in the vacuum, gas, or vapor acting on the surface of the electrode and by its exposed area. I have also discovered that when such an electrode is included in a circuit as a cathode, it will reach a current saturation value at a substantially definite voltage drop of comparatively low value, and if the voltage be increased one hundred volts or more, the current remains substantially constant. Resistance phenomena present themselves at or about the exposed surface of the electrode which prevent increase of current flow in the electric circuit with increase of impressed voltage. I have further discovered, however, that if a magnetic field be applied to the electrode acting as a cathode, the current will increase and the saturation current will become greater in proportion to the strength of the field acting on it, but will remain constant with increase of voltage at any definite action of the magnetic field on it above that at which the electrode has reached its saturation value. The resistance value of the current saturation phenomena is changed by the action of a magnetic field.

The variation of the current saturation value of an electrode acting as a cathode by variation of the action of a magnetic field and its utilization is the subject of this invention.

If the magnetic field of an electromagnet be caused to act on an electrode acting as a cathode, and its field be varied as, for instance, by means of variations of current in the circuit energizing the electromagnet, the current in the circuit of said electrode will be varied by reason of variation of the saturation current brought about by variation of the field to which it is exposed. Large electric variation may be used and produced, or my invention may be utilized for, or in connection with, feebler electric variations, such, for instance, as are used to transmit speech over a telephone line. When the resistance or reluctance to the passage of current of a vacuum, gas, or vapor device has been overcome as, for instance, by contact and rupture of a positive and negative electrode, or by high potential kick, or by heating to incandescence the conductor acting as a negative electrode, current may be caused to flow between two electrodes in the device included in an electric circuit. By means of control of the current flow in this circuit, and the position and area of the electrode designed to act as a cathode and be affected by a magnetic field, the required or desired current density at the said electrode, for the purpose of controlling its current saturation value, can be obtained.

Referring to the accompanying drawings:

Figure 1 is a diagram showing an organization of apparatus applicable to the amplification of telephone currents.

Figure 2 is a plan view showing the arrangement of the magnets of Figure 1.

Figure 3 illustrates an organization wherein the circuit that varies the field of the electromagnet is in series with the circuit that supplies, in a vacuum, gas or vapor device, the current path in which the electrode that is used as a cathode is located.

Figure 4 shows a construction of magnet that permits variation to be made in the strength of the field and also provides two paths for the magnetic line, and Figure 4ª shows an alternative construction of magnet.

Figures 6 and 7 show modified forms of apparatus and arrangements of electrodes.

Figure 5:
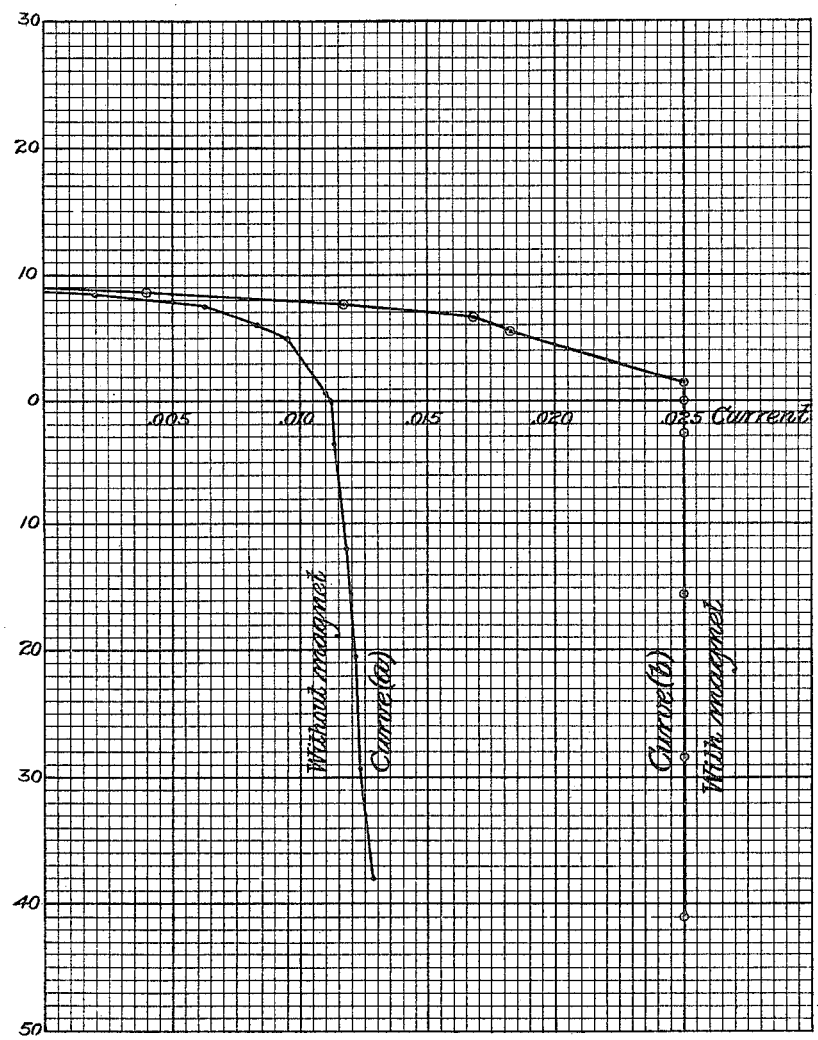
Figure 5 is a curve sheet illustrating the effect of a magnetic field applied to an electrode acting as a cathode.

The particular forms of devices and arrangements of electrodes shown in the drawings are useful for many purposes but other forms, shapes and positions of the container and the electrode in the container may be employed, it being important, however, to adjust and construct the electrode to be used as a cathode, both as to size and position, in such a way as to obtain the required value of saturation current.

Referring to Figure 1, 1 is an evacuated container, having a positive electrode, 2, a negative electrode, 3, and an auxiliary positive electrode, 4. The negative electrode is kept alive in a well-known manner by battery, 5, in the circuit, 5, 6, 4, 3, 7, where 6 and 7 are resistances or inductances, or both. A battery, or other source of electricity, 8, is shown as supplying current through a variable resistance, 9, to the electrode, 2, then through the device, 1, and negative electrode, 3, to line wire, 10, which leads back to battery 8. The keep-alive circuit, 5, 6, 4, 3, 7, may be dispensed with when the negative can be kept alive by the current flowing through the device from the electrode 2 to the electrode 3.

In the drawing, 11 and 12 represent tubular conductors of platinum, iron, or other suitable material, the walls of which form part of the container. As shown, 11 is acting as a cathode in a circuit including a battery, 13, telephone, 14, and anode, 12, but by reversing the polarity of the battery 13, the tube 12 can be made to act as a cathode and the tube 11 as an anode. Magnet windings, 15 and 16, are shown as located on adjustable pole pieces, 17 and 18, of a magnet, 19. These two windings are serially connected in circuit with the battery, 21, microphone, 20, and leads, 22, 23. The pole pieces 17 and 18 are so set that the magnetic lines between them will affect the tubular electrode 11 which is acting as a cathode. The magnet 19 may be a permanent magnet of proper strength or it may be constructed of soft iron.

The action of this arrangement is as follows:—Sound waves acting at microphone 20 vary the current in windings 15 and 16, thereby varying the field acting on electrode 11. This varying field affects the current flow at electrode 11, causing variation of current in the circuit of telephone 14, where a listener will hear reproduced the sounds impressed at 20.

In Figure 3, the same numbers indicate like elements as in Figure 1. There is here shown an organization wherein there is variation of the saturation current of electrode 11 due to variation of the field acting on it, and also due to the variation of the current density in the vacuum, gas or vapor in contact with it. The current from battery 8 flows through resistance 9, magnet windings 15 and 16, to electrode 2, thence through the vacuum, gas or vapor to electrode 3, and through lead-wire 10, back to the battery 8. Any increase of current in the above circuit will increase the current flowing in circuit 11, 13, 14 and 12, by increase of the field acting at 11, and increase of current density in the vacuum, gas, or vapor at 11, both of which actions increase the saturation current of 11. Any decrease of current will cause a decrease of current in circuit 11, 13, 14 and 12.

In Figure 4, pole pieces 17 and 18 are shown attached to iron pieces, 24 and 25, the object of which is to furnish a path which may be varied by moving iron bar, 26, in or out of the gap between pieces 24 and 25. Another object of the pieces 24 and 25 is to provide a path for the lines of force created by windings 15 and 16, other than through the magnet 19. The magnet 19 may be a weak or strong permanent magnet and, in certain cases, it may be done away with altogether as shown in Figure 4$^a$.

Figure 5 represents curves of current and voltage in an external circuit including electrodes 11, 12. It is obtained by connecting across said electrodes an external circuit which includes a battery of variable voltage and observing the external current and external voltage across the electrodes. The voltage for zero current, in the case taken, is approximately 9 volts, as shown, this being the difference of potential between the electrodes when there is no external circuit connecting them. When connected through an external circuit which includes an equal opposing battery voltage, no current flows in the external circuit. As the battery voltage is reduced current flows in the external circuit in increasing amount as the difference between the initial voltage and opposing voltage of the battery becomes greater. When the battery voltage is reduced to zero the reading shows the current when the electrodes are short circuited externally, and from there on the curve is continued by building up the battery voltage in the reverse direction. For all of the readings shown the external current flows in a direction to make electrode 11 act as a cathode, and is seen to reach a limiting value known as the saturation current, which is approximately constant over a wide range of applied voltage. The increase of current with decrease of external voltage over part of the curve shown is due to the differential effect between the externally applied and internal voltage.

Curve, a, is a curve taken with no field applied, of the current through electrode 11 plotted for different voltages across electrodes 11 and 12. It will be noted that when the voltage reaches a certain point the current becomes practically constant.

Curve, b, was taken under the same conditions, except that a magnetic field was applied to electrode 11. In this case the curve is similar, but the saturation current has increased.

By different strengths of magnetic field substantially similar curves will be obtained, having different current saturation values and a varying field will vary the electrical characteristics and move the curve to right or left, as the field is increased or diminished.

These curves serve as an example but it is understood that an apparatus may be contructed in which the current flow may be greater or smaller and that other voltages can be applied.

Figure 6 shows the application of my invention to a vacuum, gas or vapor device of the hot cathode type wherein the negative electrode corresponding to the electrode 3 of the prior figures is shown in the form of a hot wire or filament 27 which supplies the current to the vacuum, gas or vapor, enabling the use of either electrodes 28 or 29 as a cathode; the electrode not used as a cathode may be used as an anode.

Referring to Figure 7, a different arrangement of the electrodes 27, 28 and 29 of the device of Figure 6 is shown. In this case the three electrodes 30, 31 and 32 lie in the same plane.

I claim as my invention:

1. In combination with an electrode serving as a cathode and surrounding a vacuum, gas, or vapor carrying current supplied independently of said electrode, a magnetic field in operative relation to said electrode.

2. In combination with an electrode serving as a cathode and surrounding a vacuum, gas, or vapor carrying current supplied independently of said electrode, a magnetic field in operative relation to said electrode and means for varying said magnetic field.

3. The combination of an electrode serving as a cathode, a vacuum, gas, or vapor device adapted to be supplied with current independently of said electrode, said electrode surrounding the current path of said device, a circuit including said electrode, a source of electromotive force and a translating device included in said circuit, and a variable magnetic field acting on said electrode.

4. The combination of a gas, vacuum, or vapor device having portions of its walls of conducting material, means for constituting said walls respectively a cathode and an anode of an auxiliary circuit, a receiving device in said circuit, and electromagnetic means for creating a variable field of force at said cathode.

5. The combination of a vacuum, gas, or vapor device having a positive and a negative electrode, means for causing a current flow therethrough, an electrode serving as a cathode and surrounding the path of the current flow, means for constituting it an electrode for a second circuit, an electromagnet located at the last named electrode, and means for varying the intensity of the field thereof.

6. The combination of a vacuum, gas, or vapor device, an electric circuit having terminals surrounding the flow of current therethrough, one of said terminals serving as a cathode, and electro-magnetic means for directing magnetic lines of force upon one of said terminals when it is serving as a cathode.

7. In a vacuum, gas, or vapor device main electrodes, electrodes independent of the main electrodes thereof, one of the said last named electrodes surrounding the current path in the device, and means for applying magnetic lines of force to said electrode.

8. In a vacuum, gas, or vapor, device main electrodes, electrodes independent of the main electrodes thereof one of said last named electrodes surrounding the current path in the device, and means for applying magnetic lines of force to said electrode, and means for varying the number of such lines of force.

9. The combination of a device of the character described having main electrodes, supplemental electrodes surrounding the current path between the main electrodes, a receiving circuit comprising a source of electric current, a receiving instrument and conductors connecting them between said supplemental electrodes, and a transmitting circuit comprising a source of current, a current varying device and means for establishing thereby variable lines of force at one of the supplemental electrodes.

10. The combination of a primary circuit including a source of magnetic lines of force and means for producing variations in said magnetic lines of force, and a secondary or receiving circuit, a portion of which comprises a gas or vapor path, the terminals of said receiving circuit surrounding the said path, and means for applying the lines of force to one electrode of the gas or vapor path.

11. The combination of a primary circuit, including a source of magnetic lines of force and means for producing variations in said magnetic lines of force, and a secondary or receiving circuit, a portion of which comprises a gas or vapor path, the terminals of said receiving circuit comprising an anode and cathode surrounding the said path, and means for applying the lines of force to the cathode of the gas or vapor path.

12. The combination of a container, main electrodes therein, means for causing electric current to pass in a given direction between said electrodes, interposed electrodes one at least of which surrounds the path of the main current flow, a receiving electric circuit connected with the last named electrodes and means for directing lines of magnetic force upon one of said last named electrodes.

13. The combination of a container, main electrodes therein, means for causing electric current to pass in a given direction between said electrodes, interposed electrodes one at least of which surrounds the path of the main current flow, a receiving electric circuit connected with said electrodes, means for directing lines of magnetic force upon one of the interposed electrodes and means for varying the strength of such magnetic lines of force.

14. The combination of an exhausted container having restricted sections surrounding the current path therethrough and composed of metal substances, means for causing the flow of current through said restricted portions, an electric circuit of which the metal portions constitute the respective terminals, and means for producing varying magnetic lines of force at one of said terminals.

15. The combination with a vacuum, gas or vapor carrying current, of a circuit including a source of electromotive force and an electrode acting as a negative electrode and surrounding the vacuum, gas or vapor and having the voltage-current characteristics of Fig. 5.

16. The combination with a vacuum, gas or vapor carrying current, of a circuit including a source of electromotive force and an electrode acting as a negative electrode and surrounding the vacuum, gas or vapor and having the voltage-current characteristics of Fig. 5, and a magnetic field of force acting on said electrode.

17. The combination with a vacuum, gas or vapor carrying current, of a circuit including a source of electromotive force and an electrode acting as a negative electrode and surrounding the vacuum, gas or vapor and having the voltage-current characteristics of Fig. 5, a magnetic field of force acting on said electrode, and means for varying the action of the field of force.

18. The method of transmitting electrical variations such as produced by sound waves, which consists in developing thereby variations in electrical current flow, producing thereby variations in magnetic lines of force; causing such variations to vary the current emissive capacity of a cathode at the point where it surrounds a vacuum, gas or vapor path, thereby varying the flow of current through such electrode and reproducing as sound waves the variations of current flow thus produced.

19. The method of varying the quantity of current flowing in a given circuit having one of its electrodes serving as a cathode and surrounding the path of a current flowing through a vacuum, gas or vapor, which consists in establishing a flow of current through said electrode sufficient to bring it to a state of electrical saturation, and modifying the saturation point by varying lines of magnetic force.

20. The method of translating magnetic variations into electric variations, which consists in saturating a negative electrode included in an energized electric circuit and affecting the conductivity of the surface of the electrode by the magnetic variations.

21. The method of causing energy variations in an electric circuit, which consists in including in the circuit a negative electrode having the voltage current characteristics indicated in Fig. 5 and affecting the surface of the electrode by magnetic variations.

22. The combination with an electric circuit, of a source of electro-motive force, an electrode serving as a cathode in said circuit and having the voltage-current characteristics of Figure 5 and a magnetic field of force affecting the surface of the electrode.

23. The combination with an electric circuit, of a source of electro-motive force, an electrode serving as a cathode in said circuit and having the voltage-current characteristics of Figure 5, a magnetic field of force affecting the surface of the electrode, and means for varying the action of the field of force.

24. The method of increasing the saturation current of an electrode acting as a negative electrode, which consists in applying to the surface of the electrode a magnetic field of force.

25. The method of translating magnetic variations into electric variations, which consists in creating a magnetic field of force and applying it to the surface of a saturated negative electrode.

26. The method of controlling the current emissive capacity of a cold electrode acting as a cathode in an electric circuit, which consists in operating the electrode under a condition where the current therethrough is substantially constant with change of voltage, and applying lines of force to the surface of said electrode.

27. The method of reproducing electrical variations which consists in establishing current flow in a vacuum, gas or vapor device, maintaining a circuit through an auxiliary anode and cathode in said device, and varying the saturation current at the surface of said cathode to cause variations of current in the auxiliary circuit.

28. The method of reproducing in one circuit variations of current flow in another circuit which consists in establishing a current flow in the second circuit and thereby creating a condition which permits current in the first circuit to flow at a constant value with changes of voltage in its path, and varying the current carrying capacity of the first circuit by variation of current in the second circuit.

Signed at New York, in the county of New York, and State of New York, this 30th day of June, A. D. 1916.

PETER COOPER HEWITT.

Witnesses:
WALTER E. F. BRADLEY,
THOS. H. BROWN.